United States Patent
Brandenburg et al.

(10) Patent No.: US 7,424,616 B1
(45) Date of Patent: Sep. 9, 2008

(54) SYSTEM AND METHOD FOR FACILITATING ACCESS BY SELLERS TO CERTIFICATE-RELATED AND OTHER SERVICES

(75) Inventors: Jackson Brandenburg, Melrose, MA (US); Narasimhan Krishnamacharii, Cambridge, MA (US); Charles Dulin, Montclair, NJ (US)

(73) Assignee: Identrus, San Francisco, CA (US)

( * ) Notice: Subject to any disclaimer, the term of this patent is extended or adjusted under 35 U.S.C. 154(b) by 780 days.

(21) Appl. No.: 09/657,604

(22) Filed: Sep. 8, 2000

Related U.S. Application Data

(60) Provisional application No. 60/153,723, filed on Sep. 13, 1999, provisional application No. 60/153,302, filed on Sep. 10, 1999, provisional application No. 60/153,328, filed on Sep. 10, 1999.

(51) Int. Cl.
*H04L 9/32* (2006.01)
(52) U.S. Cl. .................... 713/176; 713/154; 705/67
(58) Field of Classification Search ............ 705/65, 705/74, 64, 69; 713/201, 156
See application file for complete search history.

(56) References Cited

U.S. PATENT DOCUMENTS

| | | | | |
|---|---|---|---|---|
| 5,511,121 A | * | 4/1996 | Yacobi ................ | 705/69 |
| 5,557,518 A | * | 9/1996 | Rosen ................. | 705/69 |
| 5,659,616 A | | 8/1997 | Sudia ................. | 380/23 |
| 5,706,427 A | * | 1/1998 | Tabuki ................ | 726/5 |
| 5,717,989 A | * | 2/1998 | Tozzoli et al. .......... | 705/37 |

(Continued)

FOREIGN PATENT DOCUMENTS

| | | | |
|---|---|---|---|
| WO | WO00/67143 | * | 9/2000 |

OTHER PUBLICATIONS

SET: Secure Electronic Transaction Specification. May 31, 1997. Version 1. p. 1-619.*

(Continued)

*Primary Examiner*—Christian La Forgia
(74) *Attorney, Agent, or Firm*—Sonnenschein Nath & Rosenthal LLP

(57) ABSTRACT

A system and method are disclosed for facilitating access to a plurality of certificate-related and other services including certificate validation. A seller is provided with digital signature messaging software for accessing these services. Two preferred implementations are disclosed for integrating a seller's existing Web server and applications with this software. The first preferred implementation is referred to as "passive integration" because it requires little or no modification to a seller's existing e-commerce Web application. In this first implementation, the seller's Web site is preferably provided with five additional components: a Web filter for redirecting HTTP requests, a second Web server for parsing the redirected HTTP requests, a servlet that runs applications based on the requested URL, a filter engine that identifies pages from a buyer that require the buyer's signature as well as pages that require access to system services, and a bank interface that receives requests to access system services from the filter engine, and processes those requests. The second preferred implementation is referred to as "active integration" because it requires the seller to rewrite code of its Web applications to provide the functionality necessary to access system services. In active integration, the seller's Web site is preferably provided with the bank interface described above but the functionality provided by the other digital signature messaging software components is instead provided by modifying directly the seller's Web application.

36 Claims, 18 Drawing Sheets

DSMS PASSIVE INTEGRATION

U.S. PATENT DOCUMENTS

| | | | | |
|---|---|---|---|---|
| 5,754,772 | A * | 5/1998 | Leaf | 709/203 |
| 5,850,442 | A * | 12/1998 | Muftic | 705/65 |
| 5,903,882 | A | 5/1999 | Asay et al. | 705/44 |
| 5,943,424 | A | 8/1999 | Berger et al. | 380/25 |
| 6,003,765 | A * | 12/1999 | Okamoto | 235/379 |
| 6,052,785 | A * | 4/2000 | Lin et al. | 713/201 |
| 6,072,870 | A * | 6/2000 | Nguyen et al. | 705/79 |
| 6,081,790 | A * | 6/2000 | Rosen | 705/40 |
| 6,092,196 | A * | 7/2000 | Reiche | 726/6 |
| 6,105,012 | A * | 8/2000 | Chang et al. | 705/64 |
| 6,125,352 | A * | 9/2000 | Franklin et al. | 705/26 |
| 6,327,578 | B1 * | 12/2001 | Linehan | 705/65 |
| 6,356,878 | B1 * | 3/2002 | Walker et al. | 705/26 |
| 6,363,365 | B1 * | 3/2002 | Kou | 705/64 |
| 6,601,759 | B2 * | 8/2003 | Fife et al. | 235/375 |
| 6,675,153 | B1 * | 1/2004 | Cook et al. | 705/74 |
| 6,711,679 | B1 * | 3/2004 | Guski et al. | 713/156 |
| 6,715,080 | B1 * | 3/2004 | Starkovich et al. | 726/7 |
| 6,763,459 | B1 * | 7/2004 | Corella | 713/156 |
| 6,766,454 | B1 * | 7/2004 | Riggins | 713/185 |
| 6,889,325 | B1 * | 5/2005 | Sipman et al. | 713/176 |

OTHER PUBLICATIONS

Peter Aiken et al. Microsoft Computer Dictionary. Microsoft Press. 5th Edition. p. 290.*

Phillip M. Hallam-Baker, Micro Payment Transfer Protocol (MPTP) Ver. 0.1, W3C Working Draft, at http://www.w3.org/pub/WWW/TR/WD-mptp-951122 (Nov. 22, 1995).

Mark Linehan & Gene Tsidik, Internet Keyed Payments Prorocol (iKP), at http://www.zurichibm.com/Technolo.../ecommerce/draft-tsudik-ikp-00.txt (Jul. 1995).

MasterCard Int'l Inc. Operations Manual §§ 5.11-5.14 (Nov. 1993).

* cited by examiner

```
// Redirect anything specific to an application to go through the
// DSMS

DWORD CDSMSIapiFilterFilter::ONPreprocHeaders(CHttpFilterContext* pCtxt,
        PHTTP_FILTER_PREPROC_HEADERS pHeaderInfo)
{
        // TODO: React to this notification accordingly and
        // return the appropriate status code // Filter looks for the pattern "/avf" and replaces the URL
        // with "/Servlet/DSMS_Servlet" (Will be modifiable using INI file)
        static const char strAppPath[] = "/avf";
        static const char strServletPath[] = "/Servlet/DSMS_Servlet";

char buffer[1024], *newURL;
        DWORD buffersize = sizeof(buffer);
        LVOID urlBuffer = pCtxt->AllocMem(1024);

newURL = (char*) malloc(1024);

pHeaderInfo->GetHeader (pCtxt->m_pFC, "url", buffer, &buffersize);
        char *pPos = strstr(buffer, strAppPath);

// the URL should not include http://<server name>
        if (pPos) {
                strcpy( newURL, strServletPath );
                strcat( newURL, pPos);

pHeaderInfo->SetHeader (pCtxt->m_pFC, "url", newURL);
        } return SF_STATUS_REQ_NEXT_NOTIFICATION;
}
```

Fig. 4

| | Steps |
|---|---|
| | Load Servlet properties from the properties file |
| 504 | Read data from the HTTP request |
| 506 | Create a hash table (name, value pairs) with parameters for the Filter Engine including HTTP headers, Content type, client IP address, HTTP method (GET and SET) and the actual data in the request |
| 508 | Identify if the data has been signed. If not signed, call Filter Engine with the hash table |
| 512 | If signed, URL decode the PKCS#7 message received from the Plug-In and insert it into the hash table |
| 510 | Call the Filter Engine with the hash table |
| 514 | Process the return value from the Fliter Engine |
| 516 | If the return value from the Filter Engine indicates that the web application has been called, then display the next page |
| 518 | If the return value from the Filter Engine indicates that the page needs to be signed, the state of the Filter Engine is stored in a cookie and the page with the Plug-In is displayed |
| 520 | If the return value from the Filter Engine indicates that the Client Certificate is GOOD, then change the State and send a request to Filter Engine to retrieve the next page. |
| 522 | For all other values or exceptions, display error page to the client. |

FIG. 5

```
#Sign request when user adds a new document to AltaVista
BIModeSync; BISCertStatCheck; cookie, AltaVistaForum_AuthToken, dsmith;
url, newDocForm

#Sign request when user modifies a document in AltaVista
BIModeSync; BISCertStatCheck; cookie, AltaVistaForum_AuthToken, dsmith;
URL, modDocform

#Sign request when user deletes a document from AltaVista
BIModeSync; BISCertStatCheck; Cookie, AltaVistaForum_AuthToken,
dsmith; url, delItemsForm

#Test
#BIModeSync; BISCertStatCheck;Iname,identrus;city,Boston
```

Fig. 6

```
package com.identrus.filterengine;

import java.rmi.*;
import java.util.*;
import com.identrus.util.*;

/**
This is an interface definition for the Filter Engine Server
*/ public interface IRmiFEServer extends Remote{
public ReturnObject Service (Hashtable table)
throws RemoteException;
}
```

Fig. 7

| Filter Engine Startup Steps |
|---|
| 802 — Loads Filter Engine properties from the properties file |
| 804 — Open log files |
| 806 — Load SSL or Utility Certificates |
| 808 — Load RMI server Policy File |
| 810 — Load Rules files into the memory |
| 812 — Validate Rules to verify correct formatting |
| The Filter Engine Interface is now ready to receive requests |

FIG. 8

| Filter Engine Processing Steps |
|---|
| 902 — Receives HTTP Request data and the State from the Servlet |
| 904 — If the State passed from the Servlet is FE_NEW_REQUEST, the Filter Engine compares the request against the signing rules and determines whether the request has to be signed or not. It builds the Return Object specified in the FE_NEW_REQUEST State. |
| 906 — If the State passed in from the Servlet is FE_SIGNED_DATA, then it calls the Bank Interface to check the status of the Certificate. After interacting with the Identrus network, the Bank Interface returns the status. The status and the data in the CMS message are put into a Return Object and sent to the Servlet |
| 908 — If the State passed from the Servlet is FE_REQUEST_CHECKED, indicating the final stage of a signed transaction, the Web Application is called. The original page is retrieved from the Web Application and its content is returned to the Servlet in a Return Object |
| Log all signed request to the event log and all errors to the error log |
| All exceptions are returned to the Servlet as part of the Return Object |

FIG. 9

| Bank Interface Startup Steps | |
|---|---|
| 1102 | Loads Bank Interface properties from the properties file |
| 1104 | Open log files |
| 1106 | Load SSL or Utility Certificates |
| 1108 | Load RMI server Policy File |
| 1110 | Load cryptographic modules, either software or hardware (Hardware Security Module API) as specified in the properties file |
| | At this stage the Bank Interface is ready to receive service request |
| | Call Bank Interface service manager with the DSMS request that contains the name of the service, mode of the service and the message |

FIG. 11

| | Steps |
|---|---|
| 1202 | Retrieve Relying Customer and Root Certificate from the server |
| 1204 | Retrieve Subscribing Customer and Issuing Participant's Certificate from the CMS (Cryptographic Message Syntax) also referred as PKCS#7. |
| 1206 | Verify signature on the CMS message |
| 1208 | Verify signature on the Subscribing Customer's Certificate using the Issuing Participant's Certificate |
| 1210 | Verify signature on the Issuing Participant's Certificate using the Identrus Root Certificate that belongs to the Relying Participant |
| 1212 | The Validity period is then checked on the two Certificates received against the current date |
| 1214 | Retrieve the OCSP responder's URL from the Relying Customer's certificate |
| 1216 | Create an OCSP request for the Subscribing Customer's Certificate signed by the Relying Customer. All OCSP requests contain a Service Locator Extension, which is set by the Authority Information Access (AIA) extension defined in this certificate |
| 1218 | Log the OCSP request to the transaction log |
| 1220 | Create HTTP(S) connection to the OCSP responder and send the OCSP request. |
| 1222 | Receive OCSP response from the responder and verify the signature using the OCSP Responder's Certificate |
| 1224 | Get the status of the certificate from the Response |
| 1226 | Repeat steps 8 through 11 for the Issuing Participant and the Relying Participant's OCSP Responder's certificate |
| 1228 | Log the OCSP response to the transaction log |
| 1230 | If the status of all the responses are GOOD return GOOD, else return the status |
| 1232 | Log all signed request to the event log and all errors to the error log |
| | All exceptions are returned to the client as part of the Return Object |

FIG. 12

| # | Description | Protocol |
|---|---|---|
| 1301 | User clicks 'Submit' button on HTML Form in Web Browser | HTML UI |
| 1302 | Web Browser posts form data to SDK Web Server | HTTP |
| 1303 | SDK Web Server passes all requests to Servlet. | |
| 1304 | Servlet passes request to Filter Engine. | RMI |
| 1305 | Filter Engine creates a Return-to-Browser URL (as a GET with parameters for data) representing the data of the original POST or GET form posting and returns it along with instructions to get the data signed to the Servlet | RMI |
| 1306 | Servlet builds a response with<br>1. An Applet tag pointing to the Client Interface Applet OR<br>2. A call to a browser plug-in and the arguments Return-to-Browser URL and the data to sign. | Servlet |
| 1307 | SDK Web Server returns the Servlet's response to the Web Browser. | HTTP |
| 1308 | Web Browser displays the HTML Page (requests the Applet if necessary) | HTTP |
| 1309 | Web Browser displays Client Interface Applet or activates the plug-in,<br>The arguments are the data to sign and possibly a URL | Browser |
| 1310 | User clicks button in to approve signing of form data. | GUI |
| 1311 | Client Interface (applet or plugin) calls Smart Card API to request that the Smart Card sign an SHA-1 hash of the form data. | Client Interface |
| 1312 | User enters PIN when driver ask for it. | OS Dialog |
| 1313 | Smart Card API returns signed form data to Client Interface. | Client Interface |
| 1314 | Client Interface makes a HTTP connection to the SD1(Web Server and submits the signed form data. | HTTP |
| 1315 | SDK Web Server passes request to Servlet | Servlet |
| 1316 | Servlet passes request to Filter Engine. | RMI |
| 1317 | Filter Engine calls Bank Interface with signed data. | RMI |

FIG. 13A

| 1318 | The Bank Interface calls the Open Card API to request that the HSM sign an SHA-1 hash of the request to the bank. | Java Function Call |
|---|---|---|
| 1319 | Open Card API calls HSM OS Driver | Java Native Call |
| 1320 | HSM OS Driver calls HSM to perform signature. | OS-Level Hardware Call |
| 1322 | HSM OS Driver returns signed request to Open Card API | Java Native Call |
| 27 | Open Card API returns signed request to Bank Interface | Java Function Call |
| 2028 | Bank Interface calls the relying party's bank. | Warranty/Status Check |
| 2029 | Relying party's bank calls the issuing party's bank. | Warranty/OCSP |
| 1330 | Issuing party's bank returns a signed response to relying party's bank. | Warranty/OCSP |
| 1331 | Relying party's bank then calls the root. | Warranty/OCSP |
| 1332 | Root returns a signed response to the relying party's bank. | Warranty/OCSP |
| 1333 | Relying party's bank returns a signed response to the Bank Interface. | Warranty/Status Check |
| 1334 | Bank Interface validates the signed data and then records the transaction in the log. | File I/O |
| 1335 | Bank Interface validates the signed data and then stores the signed data and the signed response from the relying party's bank into the SDK's database. | JDBC |
| 1336 | Bank Interface returns an OK or failure result to Filter Engine | RMI |
| 1337 | Filter Engine returns failure result to Servlet or passes on initial request to App Server. | RMI |
| 1338 | Servlet builds response indicating failure for SDK Web Server. | Servlet |
| 1339 | SDK Web Server returns servlet response to the browser if failure. | HTTP |
| 45 | Web Application's Web Server calls the Web Application | ISA |
| 46 | Web Application generates and returns its response. | ISA |
| 47 | Web Application's Web Server returns the response to the Filter Engine | HTTP |

FIG. 13B

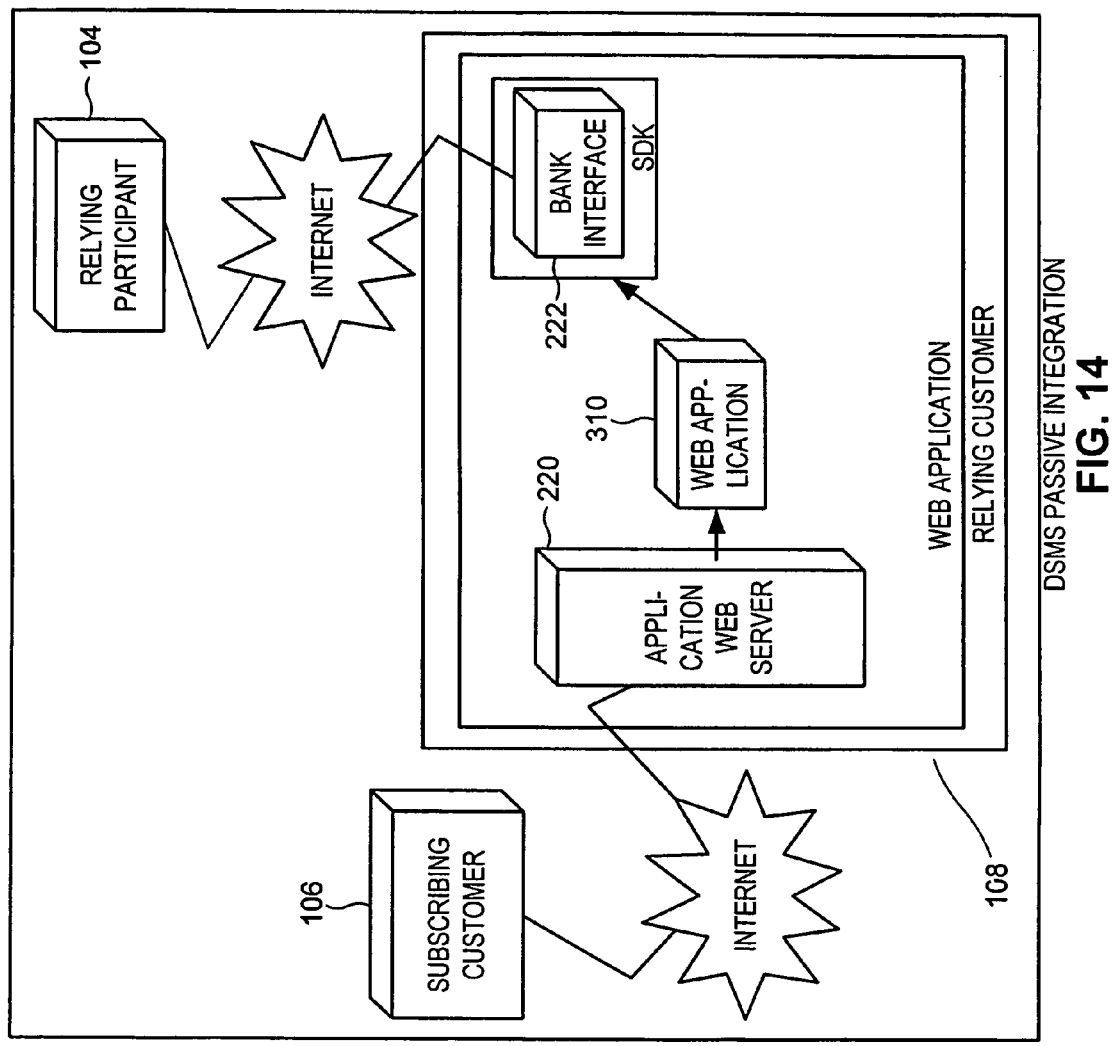

| # | Description | Protocol |
|---|---|---|
| 1501 | User requests form that will require signing when submitted. | HTML UI |
| 1502 | Web Browser sends request to Web Server. | HTTP |
| 1503 | Web server forwards request to Web Application. | ISA |
| 1504 | Web Application returns an HTML page for the web server to return which references the Client Interface | ISA |
| 1505 | Web Server returns the HTML Page to Web Browser. | HTTP |
| 1506 | Web Browser requests Client Interface from Web Server. | HTTP |
| 1507 | Web Server retrieves Client Interface. | OS File System |
| 1508 | Web Server returns Client Interface. | HTTP |
| 1509 | User clicks the submit and sign button in the web page. | HTML UI |
| 1510 | Web Browser calls Client Interface. | Client Inerface Technology |
| 1511 | Client Interface calls Windows PC/SC to have Smart Card sign data. | OS API |
| 1512 | User enters PIN. | OS Dialog |
| 1513 | Windows PC/SC calls Smart Card to sign data. | OS-Level Hardware Call |
| 1514 | Windows PC/SC returns signed data to Client Interface | OS API |
| 1515 | Client Interface returns signed data. | Client Inerface Technology |
| 1516 | Web Browser posts signed data. | HTTP |
| 1517 | Web server passes signed posting to Web Application. | ISA |
| 1518 | Integration Code added to the Web Application calls the Bank Interface to verify the signature on the form. | Bank Interface Technology |
| 1519 | Bank Interface calls HSM OS Driver to sign request. | OS-API |
| 1520 | HSM OS Driver calls HSM to sign request. | OS-Level Hardware Call |

FIG. 15A

| 1521 | HSM OS Driver returns signed request to Bank Interface | OS-API |
|------|--------------------------------------------------------|--------|
| 1522 | Bank Interface calls the Relying Party's Bank. | Warranty/Status |
| 1523 | Relying Party's Bank calls the Issuing Party's Bank. | Warranty/OCSP |
| 1524 | Issuing Party's Bank returns a signed response to Relying Party's Bank. | Warranty/OCSP |
| 1525 | Relying Party's Bank calls the Root. | Warranty/OCSP |
| 1526 | Root returns signed response to the Relying Party's Bank. | Warranty/OCSP |
| 1527 | Relying Party's Bank returns signed response to the Bank | Warranty/Status |
| 1528 | Bank Interface stores the signed data and the signed OK response from the relying party's bank into the Signed Documents repository. | Database-Access API |
| 1529 | Bank Interface writes transaction log message. | File I/O |
| 1530 | Bank Interface returns result to Web Application. | Bank Interface Technology |
| 1531 | Web Application interprets the form post and returns the next page to the Web Server or an error. | ISA |
| 1532 | Web Server returns the page to the Web Browser. | HTTP |

FIG. 15B

```
# Sample Servlet Properties File

# The name of the RMI Server class file
Servlet.fename=com.root.filterengine.RmiFEServer
# The IP Address/URL of the Filter Engine's RMI Server
Servlet.feip=rmi://10.1.20.163
```

Fig. 16

```
# Sample Filter Engine Properties File

# The name of the RMI Server class file
SERVER_NAME=com.root.filterengine.RmiFEServer

# The IP Address/URL of the Filter Engine RMI Server
IP_ADDRESS=10.1.20.163

# Location of the Policy file
POLICY_FILE=/dev/src/filterengine/policy

# URL of the Web Application
WEB_APP_URL=http://root8.root.com

# Location of the Rules file
RULES_FILE=/root/rules/RulesFile.txt

# The Name and Location of the Log File
LOG_PATH-/root/logs/fe

# Need'/' at end of CLASS_DIR
CLASS_DIR=file:/root/

# The name of the RMI Server class file
SSL_CERTS_DIRECTORY=/root/sslcerts
```

Fig. 17

```
# Sample Bank Interface Properties File -- Log file Path & type (Flat/DB)
LOG_PATH=/root/logs/bi
LOG_TYPE=TRANS_DB
#LOG_TYPE=TRANS_FILE

# Cryptographic Engine Type/Log File
#HSM_TYPE=com.root.hsm.HSMCryptoPKCS11
HSM_TYPE=com.root.hsm.HSMCryptoSoftware
HSM_LOG_FILE=/root/logs/hsm.log

# Relying Customer Certificate/Private Key for Software Engine
REQUEST_CERT=/root/certs/RelyingCustomer.crt
REQUEST_PRIV_KEY=/root/certs/PrivateKey.pvk

# Root Certificate for Software Engine
ROOT_CERT=/root/certs/Root.crt

# Specify the RMI Server Name/IP address
SERVER_NAME=com.root.bankinterface,RmiBIServer
IP_ADDRESS=root11.root.com

# BankInterface policy file
POLICY_FILE=/root/policies/bipolicy

# CSP Responder URL and SSL
RESPONDER_URL=https://testlab8.qa.valicert.com:90/

# Need '/' at end of CLASS_DIR
CLASS_DIR=file:/root/
#IssuingBank Certificate. Only for test until we get new SmartCards
DEBUG=/root/certs/IssuingBank.crt

#Directory of trusted CA Certificates for SSL.
SSL_CERTS_DIRECTORY=/root/sslcerts/
```

SYSTEM AND METHOD FOR FACILITATING ACCESS BY SELLERS TO CERTIFICATE-RELATED AND OTHER SERVICES

This application claims priority to U.S. provisional patent application Ser. No. 60/153,302, filed Sep. 10, 1999, entitled System and Process for Certification in Electronic Commerce, U.S. provisional patent application Ser. No. 60/153,328, filed Sep. 10, 1999, entitled System and Process for Certification in Electronic Commerce, and U.S. provisional patent application Ser. No. 60/153,723, filed Sep. 13, 1999, entitled Pilot Web Application and Software Development Kit Architecture, all three of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of facilitating electronic commerce by providing services via a public key infrastructure.

BACKGROUND OF THE INVENTION

The world of electronic commerce has created new challenges to establishing relationships between contracting parties. One of those challenges springs from the fact that the parties to the transaction cannot see or hear each other, and cannot otherwise easily confirm each other's identity and authority to act.

One remedy for this problem is to provide each contracting party with a private key for signing transmitted messages. The signing party makes available an associated public key that decrypts messages signed with the party's private key, and thus enables a receiving party to confirm the identity of the sender.

But the sender's public key may not be known a priori to the recipient. In that event, the sender may transmit with its signed message a digital certificate issued by a certificate authority. The certificate is itself a signed electronic document (signed with the private key of the certificate authority) certifying that a particular public key is the public key of the sender.

In some cases, the recipient may be unfamiliar with the public key of the certificate authority or may not know whether the certificate is still valid. In that event, the recipient may wish to check the authenticity and validity of the certificate with an entity that it trusts. One known protocol for checking certificate status is the on-line certificate status protocol (OCSP).

SUMMARY OF THE INVENTION

A system and method are disclosed for facilitating access to a plurality of certificate-related and other services including certificate validation. In a preferred embodiment, these services are provided within the context of a four-corner trust model. The four-corner model comprises a buyer, also referred to as the subscribing customer, and a seller, also referred to as the relying customer, who engage in an on-line transaction.

The buyer is a customer of a first financial institution, referred to as an issuing participant. The issuing participant acts as a certificate authority for the buyer and issues the buyer a hardware token including a private key and a digital certificate signed by the issuing participant. The seller is a customer of a second financial institution, referred to as the relying participant. The relying participant acts as a certificate authority for the seller and issues the seller a hardware token including a private key and a digital certificate signed by the relying participant. The system also includes a root certificate authority that issues digital certificates to the issuing and relying participants.

At the time of a transaction, the buyer creates a hash of the transaction data, signs the hash, and transmits the transaction data, the signature, and its digital certificate to the seller. The seller may then request system services such as certificate validation from its financial institution, the relying participant.

The present system and method provide the seller with digital signature messaging software for accessing these system services. Two preferred implementations are disclosed for integrating a seller's existing Web server and applications with this software and, more generally, with the public key infrastructure described below.

The first preferred implementation is referred to as "passive integration" because it requires no modification to a seller's existing e-commerce Web application. This implementation is designed for organizations seeking the least complex and least intrusive method of integrating their existing Web server with the computer systems of other entities in the four-corner model.

In this first implementation, the seller's Web site is preferably provided with five additional components: a Web filter, a second Web server, a servlet, a filter engine, and a bank interface. The Web filter redirects all requests received by the seller's Web site from the seller's existing Web application to the second Web server. The second Web server parses the request and forwards it to the servlet. The servlet accepts connections, runs applications based on the requested URL, and parses the connections to the filter engine. The filter engine identifies pages from the buyer that require the buyer's signature, formats the data from such pages for signature, and returns the data to the servlet with instructions to have the data signed by the buyer. The servlet generates a response to the buyer's browser that requests signature of the formatted data. The buyer signs the formatted data and returns it to the seller.

The signed data is forwarded to the seller's bank interface which generates a signed request for service, and transmits the request to the seller's relying participant. When, for example, the requested service is certificate validation, the bank interface generates an OCSP request for transmission to the seller's relying participant. The relying participant processes the request and returns a response to the seller's bank interface.

Passive integration may be preferred by sellers having small computer staffs because it is less time consuming to implement, although less efficient. Minimal knowledge of a seller's existing e-commerce applications and core technologies is required to successfully integrate the seller's Web site with other system components. Little or no modification of e-commerce application source code is required.

The second preferred embodiment is referred to as "active integration" because it requires the seller to rewrite code of its Web applications to provide the functionality necessary to access system services. In active integration, the seller's Web site is preferably provided with the bank interface described above but the functionality provided by the other digital signature messaging software components is instead provided by modifying directly the seller's Web application.

Active integration may be preferred by advanced organizations looking for complete integration with existing applications. Access to the seller's e-commerce application source code and a computer staff with a strong technical background are typically required for active integration.

BRIEF DESCRIPTION OF THE DRAWINGS

The above summary of the invention will be better understood when taken in conjunction with the following detailed description and accompanying drawings, in which:

FIG. 4 shows sample code suitable for implementing filter 302 of FIG. 3;

FIG. 5 is an example of servlet 304 process flow in a preferred embodiment;

FIG. 6 is an exemplary format of a rules file for filter engine 306 in a preferred embodiment;

FIG. 7 illustrates sample code that may be used in a preferred embodiment to invoke the filter engine RMI server;

FIG. 8 illustrates a preferred embodiment of the steps invoked when filter engine 306's RMI server is started;

FIG. 9 illustrates a preferred embodiment of the steps invoked when servlet 304 sends a request to filter engine 306;

FIG. 11 illustrates a preferred embodiment of the steps invoked when the RMI server of bank interface 222 is started;

FIG. 12 illustrates the steps invoked when filter engine 306 sends a request to bank interface 222 in a preferred embodiment;

FIG. 13 illustrates an example of system operation using passive integration;

FIG. 14 is a block diagram of a preferred architecture for actively integrating digital signature messaging software with a seller's existing Web application;

FIG. 15 illustrates an example of system operation using active integration.

FIG. 16 illustrates an exemplary set of properties for servlet 304;

FIG. 17 illustrates an exemplary set of properties for filter engine 306; and

FIG. 18 illustrates an exemplary set of properties for bank interface 222.

DETAILED DESCRIPTION OF THE PREFERRED EMBODIMENTS

The present disclosure relates to a system and method that permit customers of financial institutions to securely obtain online certificate validation and other services. In a preferred embodiment, these services are provided within the context of a four-corner trust model. A preferred embodiment of this four-corner model is shown in FIG. 1.

Figure 1:
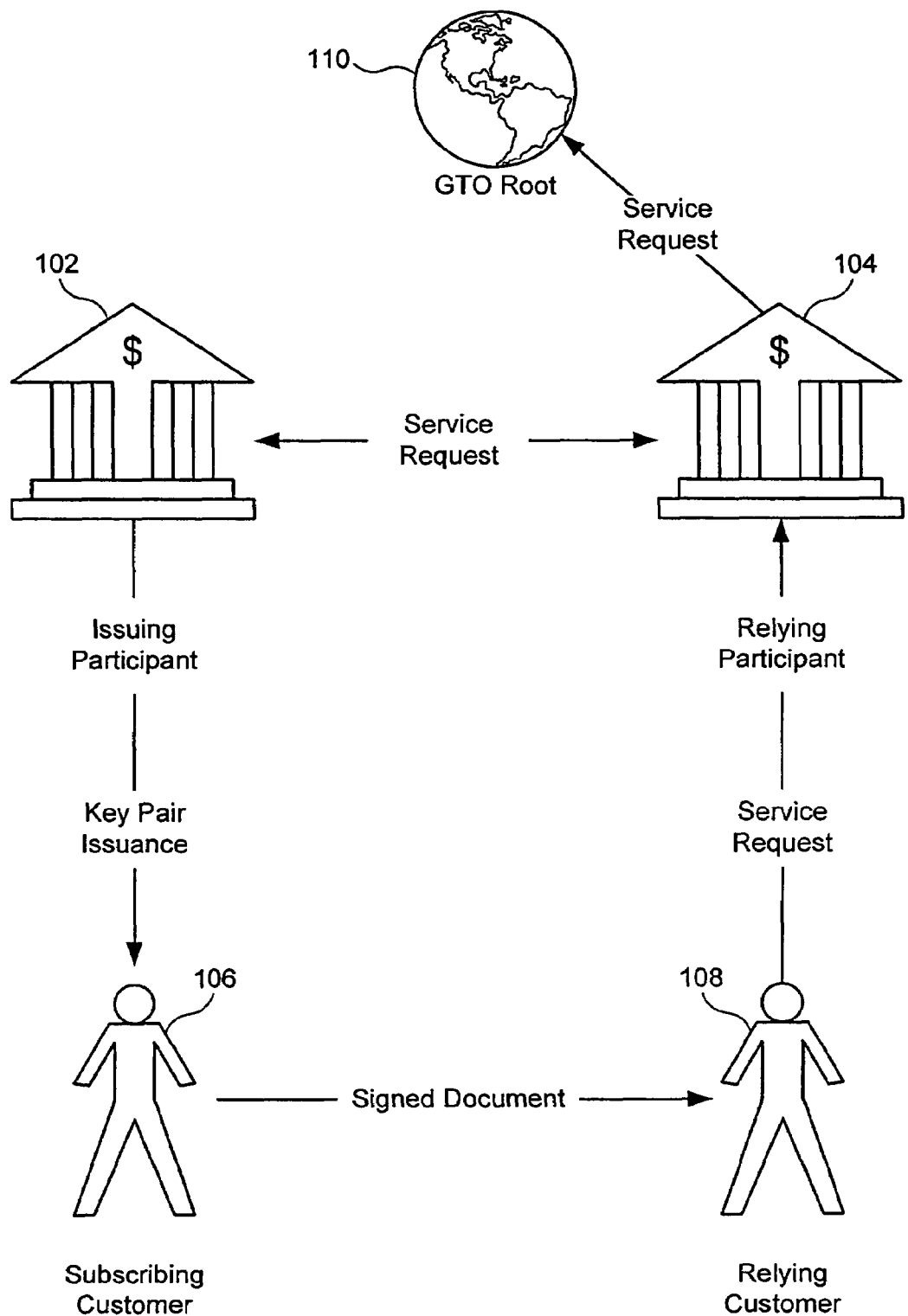
FIG. 1 is a block diagram of a preferred embodiment of the four-corner model employed by the present system.

As shown in FIG. 1, the four-corner model preferably comprises a first institution 102 and a second institution 104. First institution 102 is referred to as the "issuing participant" because it is a participant in the present system and issues smart cards to its customers, as described below. Second institution 104 is referred to as the "relying participant" because it is a participant in the present system and its customers rely on representations made by issuing participant 102 and issuing participant 102's customers, as described below. Participants 102, 104 are typically banks or other financial institutions.

Also shown in FIG. 1 are a first customer 106 and a second customer 108. First customer 106 and second customer 108 are preferably customers of issuing participant 102 and relying participant 104, respectively. First customer 106 is referred to as the "subscribing customer" because this customer subscribes to services provided by issuing participant 102. First customer 106 is also referred to as the "buyer" because it typically fills that role in transactions with second customer 108, as described below. Second customer 108 is referred to as the "relying customer" because it relies on representations made by both issuing participant 102 and subscribing customer 106. Second customer 108 is also referred to as the "seller" because it typically fills that role in transactions with first customer 106, as described below. It should be recognized, however, that although the description below speaks largely in terms of a buyer 106 and a seller 108, first customer 106 and second customer 108 may instead have different roles in a given transaction. For example, first customer 106 may be a borrower repaying a loan to second customer 108.

Also shown in FIG. 1 is a root entity 110. Root entity 110 is typically an organization that establishes and enforces a common set of operating rules for facilitating electronic commerce and electronic communications. Root entity 110 may be owned jointly by a plurality of banks and/or other financial institutions that have agreed to adhere to these operating rules. One exemplary embodiment of such a root entity is described in copending application Ser. No. 09/502,450, filed Feb. 11, 2000, entitled System and Method for Providing Certification Related and Other Services, which is hereby incorporated by reference.

Figure 2:
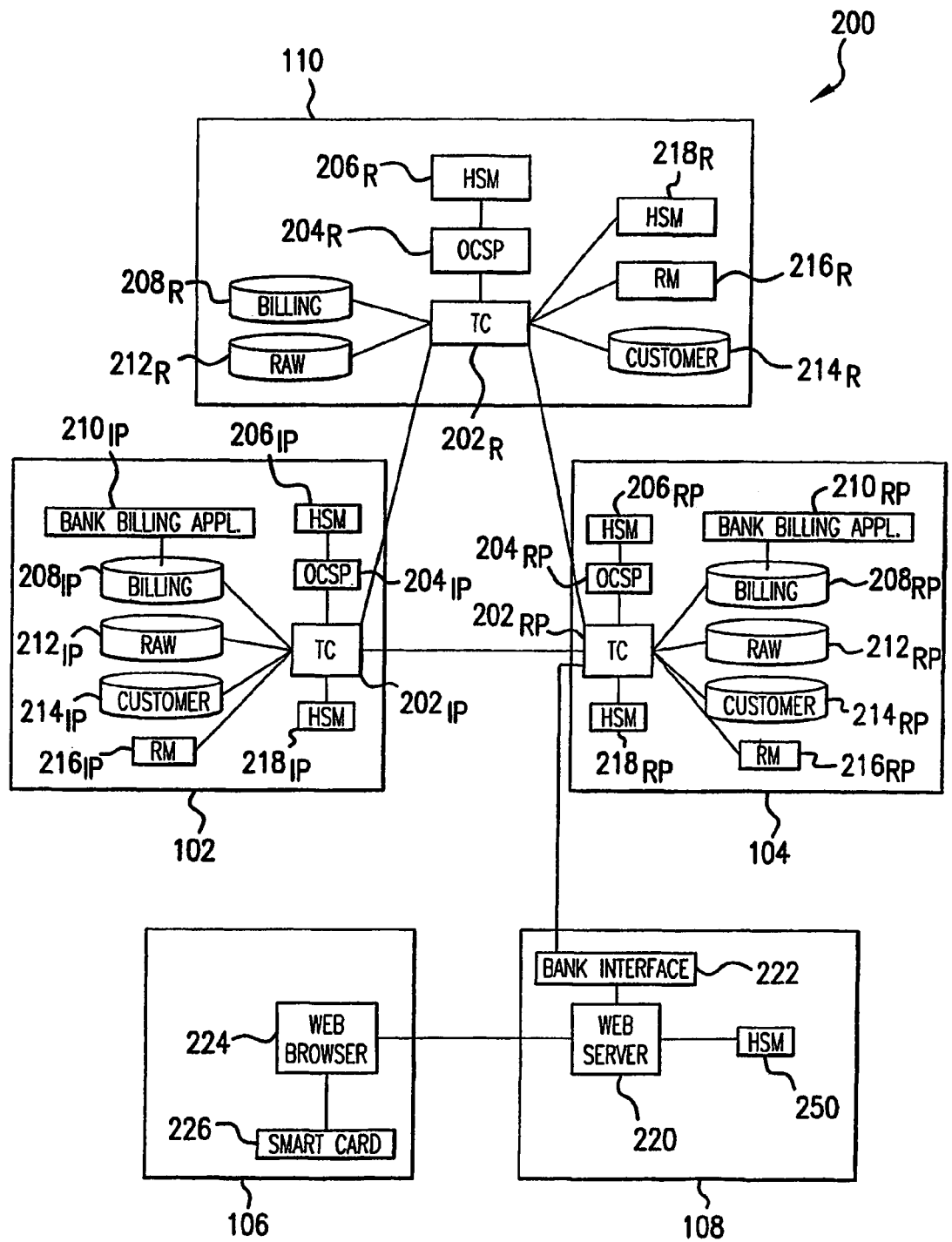
FIG. 2 is a block diagram depicting components preferably provided at entities in the four-corner model.

FIG. 2 is a block diagram depicting components preferably provided at each entity in the four corner model. As shown in FIG. 2, participants 102, 104, and root entity 110 are each preferably provided with a transaction coordinator 202 that serves as a gateway for transmitting and receiving all inter-entity messages related to services provided by the present system. Each transaction coordinator 202 is preferably provided with an associated hardware security module (HSM) 218 for signing and verifying messages. Transaction coordinators 202 provide a single interface to issuing participant 102's and relying participant 104's on-line services and implement safeguards necessary to ensure secure electronic communications between transaction coordinators 202 and other entities in the four-corner model, as described in copending U.S. patent application Ser. No. 09/657,605 filed on Sep. 8, 2000, entitled System and Method for Providing Certificate Validation and Other Services, which is hereby incorporated by reference.

Participants 102, 104, and root entity 110 are each further preferably provided with an Online Certificate Status Protocol (OCSP) responder 204 and associated HSM 206 for signing and verifying signatures on messages.

As further shown in FIG. 2, relying customer 108 is preferably provided with a Web server 220 adapted to receive and transmit information via the Internet. Relying customer 108 is further preferably provided with a bank interface 222 for accessing system services, as described in more detail below. Relying customer 108 is preferably further provided with a hardware security module 250 for signing and verifying signatures on messages.

Other components shown in FIG. 2 as well as exemplary services and message flows for such services are described in copending U.S. patent application Ser. No. 09/657,621 filed on Sep. 8, 2000, entitled System and Method for Providing Certificate Validation and Other Services and U.S. patent application Ser. No. 09/657,622 filed on Sep. 8, 2000, entitled System and Method for Providing Payment Services in Electronic Commerce.

In a preferred embodiment, each system entity is provided with two digital certificates (and corresponding private keys) to facilitate authentication: An identity certificate (also referred to, in some cases, as a warranty certificate) and a utility certificate.

The identity private key is used to produce digital signatures that are required by root entity 110 as evidence of an entity's contractual commitment to the contents of an electronic transaction. A certificate chain is typically required to support operations using this key. The status of the identity certificate may be obtained by requesting certificate validation.

The utility private key is used to produce digital signatures that allow additional transactional security. Typically, utility certificates are used to support secure socket layer sessions, to sign S/MIME messages, and for other utility applications. A certificate chain is also needed to support operations using the utility key. The status of the utility certificate, however, may not be available to a requester. Throughout this document, the term "certificate" refers to an identity certificate unless otherwise stated.

In a preferred embodiment, subscribing customer 106's digital certificates and associated private keys are provided to it by issuing participant 102. Issuing participant 102 preferably issues smart cards or other suitable instruments to subscribing customer 106 that include at least the private key associated with the subscribing customer's identity certificate. If desired, the smart card may also include the subscribing customer's identity certificate. Preferred specifications for the smart card, its manufacture, and contents are described in copending U.S. provisional patent application Ser. No. 60/224,994, filed Aug. 14, 2000, entitled Signing Interface Requirements, Smart Card Compliance Requirements, Warranty Service Functional Requirements, and Additional Disclosure, which is hereby incorporated by reference.

As noted above in the Summary of the Invention, the seller is preferably provided with digital signature messaging software for accessing system services. This software is preferably integrated with the seller's computer system. Two preferred implementations for achieving this integration are described below.

The first preferred implementation is referred to as passive integration because it requires no modification of a seller's existing e-commerce Web application. A preferred architecture for implementing passive integration at a seller's Web site is shown in FIG. 3.

Figure 3:
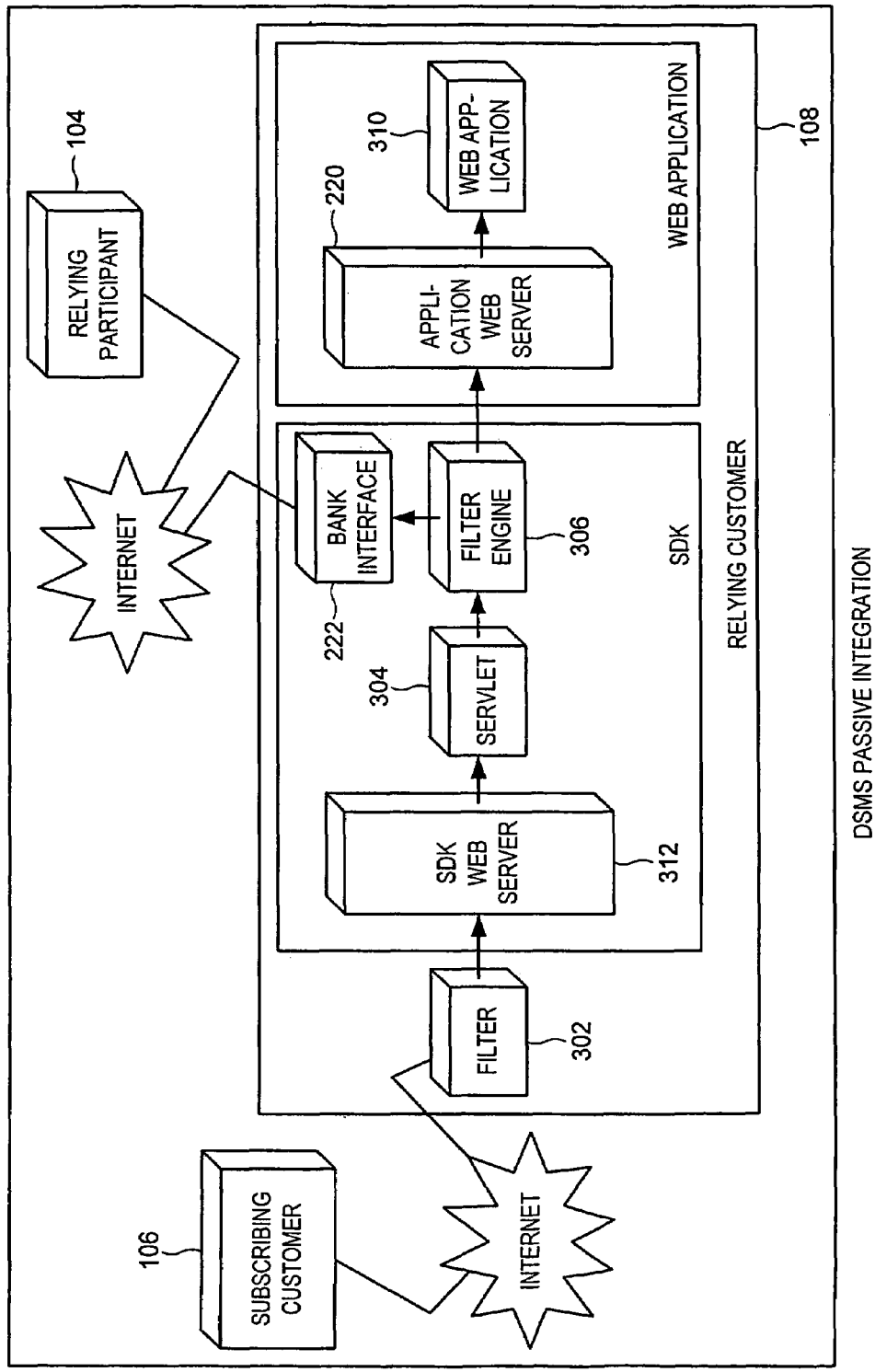
FIG. 3 is a block diagram of a preferred embodiment for passively integrating digital signature messaging software with a seller's existing Web application.

As shown in FIG. 3, seller 108 is preferably provided with several additional digital signature messaging software components that supplement the seller's existing ecommerce Web server 220 and Web application 310. In particular, seller 108 is preferably provided with a filter 302, an SDK Web server 312, a servlet 304, a filter engine 306, and a bank interface 222.

Before describing the architecture and operation of each software component in detail, a brief overview of overall operation of the digital signature messaging software is provided. In general terms, filter 302 intercepts HTTP requests from buyer 106 and redirects the requests to SDK Web server 312. SDK Web server 312 parses the request and forwards the parsed request to servlet 304. Servlet 304 builds a hash table based on the information received from browser 224 and sends the hash table to filter engine 306. Filter engine 306 analyzes the hash table to determine if it contains data that requires signing and/or a request for a service provided by system 200 (e.g., certificate validation).

Assume, for example, that data requiring signature is included in an intercepted HTTP request. In that event, filter engine 306 formats the data for signing and passes an object to servlet 304 indicating that signature is required. Servlet 304 builds a response to browser 224 that invokes a signing interface to cause the buyer's smart card 226 to sign the formatted data.

Preferred embodiments for implementing this signing interface are described in copending U.S. provisional patent application Ser. No. 60/224,994, filed Aug. 14, 2000, entitled Signing Interface Requirements, Smart Card Compliance Requirements, Warranty Service Functional Requirements, and Additional Disclosure, which is hereby incorporated by reference. As disclosed therein, in one preferred embodiment this signing interface may be implemented using a JAVA applet downloaded from the customer seller's Web server to the buyer's Web browser.

Using a JAVA applet to implement the client interface is advantageous for several reasons. First, the applet can be automatically downloaded from the server each time it is used; therefore, no additional software is required on the signer's machine to support PKI integration (except for the drivers necessary for smart card access) and the applet can be updated without client distribution requirements. Second, JAVA is a cross-platform technology and therefore use of a JAVA applet allows the system to support all JAVA compliant browsers. Third, the OpenCard API provides smart card access from JAVA.

In a second preferred embodiment, data signing may be handled by a series of browser plug-ins. For example, GENERAL NETWORK SOLUTIONS provides a set of browser plug-ins called FormSign that may be used to sign a form's posted data. In this preferred embodiment, one or more plug-ins are installed on the client's machine before signing occurs. A plug-in may, for example, be downloaded over the Internet to the client's computer the first time the user receives a page referencing; it. Plug-ins provide a good solution for active integration where the HTML page to be signed can be modified to explicitly reference the plug-in.

The signed data and buyer's certificate are passed back to filter engine 306 which then determines whether a system service is required. For example, the seller may wish to validate the buyer's certificate. In that event, filter engine 306 transmits a message to bank interface 222 which formulates a formal OCSP request and transmits it to transaction coordinator $202_{RP}$ of relying participant 104. An OCSP response is generated as described 30 in more detail in copending U.S. patent application Ser. No. 09/657,621 filed on even date herewith Sep. 8, 2000, entitled System and Method for Providing Certificate Validation and Other Services, which is hereby incorporated by reference, and returned to bank interface 222, which forwards the response to filter engine 306.

Filter engine 306 then passes an object to servlet 304 indicating the result of the certificate status check. Assuming the certificate validates properly, servlet 304 then instructs filter engine 306 to pass the original HTTP request to existing Web application 310 and retrieve the next page to be transmitted to buyer 106.

Thus, an important attribute of passive integration is that SDK Web server 312 receives all incoming connections previously destined for Web server 220. Few changes to original Web server 220 are needed, except that it is no longer accessible from the Internet. Additionally, existing certificates used for SSL encryption may need to be reconfigured to use SDK Web server 312.

It should be noted that although existing Web server 220 and SDK Web server 312 are shown as distinct components in FIG. 3, SDK Web server 312 may be implemented as a new virtual domain on existing application Web server 220 if it has sufficient processing resources. Otherwise a separate Web server may be provided.

A computer platform for implementing Web server 312 preferably contains a minimum of 128 Mb of random access memory and a 10 Mb hard disk. In a preferred embodiment, the system may be implemented on the MICROSOFT WINDOWS NT platform.

In a preferred embodiment, JAVA is used as a language/platform and is compiled to an intermediate format called byte codes. These byte codes are then executed by a virtual machine. If a JAVA Virtual Machine (JVM) is available for the target platform, the JAVA code can be executed on that platform Each component of the digital signature messaging software will now be described in more detail. Filter 302 provides a high level event-handling mechanism that redirects HTTP requests from the seller's application Web server 220 to SDK Web server 312. In a preferred embodiment, filter 302 may be implemented using Microsoft ISAPI (Internet Server Application Programming Interface). It should be noted that ISAPI is a Microsoft technology that can be used only with Microsoft IIS (Internet Information server). However, filters providing similar functionality can also be designed for Netscape's Enterprise Server. Filter 302 may comprise libraries that when run intercept specific server events and redirect all HTTP requests to SDK Web server 312.

In a preferred embodiment, filter 302 is adapted to provide enhanced logging capabilities by tracking more information than that provided by basic Web server log files. In addition, it may employ custom authentication techniques by interposing a unique filter with its own user ID and password method on access requests for a particular type of resource.

Sample code for implementing a filter 302 is shown in FIG. 4. In a preferred embodiment, distribution of this component may include a compiled DLL (filter.dll) library and source files (filter.c) used to create the DLL. In addition, the ISAPI extension wizard included with Microsoft Visual C++6.0 may be used to modify and subsequently compile the files. The compiled library must then be added to the Web server's filter list with highest priority.

In a preferred embodiment, servlet 304 transfers all requests redirected by filter 302 from Web server 312 to filter engine 306, as described in more detail below. Servlets are a type of Internet server application (ISA). ISAs cause special software applications to run when a user requests redirected by filter 302 certain URLs from a Web server. The ISA is responsible for accepting incoming connections and passing them to filter engine 306 according to filter engine 306's interface. In addition, the ISA is adapted to generate HTTP responses based on data received from filter engine 306.

A number of ISA technologies exist; some are specific to one Web server and others are-industry-standards supported by most major Web servers. Because the present-system preferably supports many Web server and platform combinations, a JAVA implementation is preferred for implementing this ISA. Servlet technology is based on JAVA and is supported by several commercially available Web servers through third-party servlet engines. In a preferred embodiment, servlet 304 may be implemented using LIVE SOFTWARE'S JRUN 2.2 product a servlet engine that provides integration with several commercially available Web servers, including MICROSOFT INTERNET INFORMATION SERVER ("IIS"), NETSCAPE ENTERPRISE SERVER ("NES"), and APACHE.

Performance issues with servlets, however, may drive a decision to implement other ISA technologies. For example, in an alternative preferred embodiment, the functionality of servlet 304 may instead be provided by an Internet Server Application Programming Interface (ISAPI). ISAPI is a C-based ISA developed for MICROSOFT INTERNET INFORMATION SERVER (US). A port of ISAPI has been done for the APACHE Web server as well. The corresponding, but different, ISA technology for NETSCAPE ENTERPRISE SERVER (NES) is NETSCAPE SERVER APPLICATION PROGRAMMING INTERFACE (NSAPI). These two interfaces provide close, C-based support for their respective Web servers and therefore provide maximum performance. The problem with using these C-based technologies is the number of platform and Web server combinations that must be written to cover the same breadth as a servlet. Thus, although servlets are typically preferred, ISAPI and NSAPI extensions may be written as necessary for select platforms to improve performance.

In a preferred embodiment, servlet 304 is adapted to maintain the state of filter engine 306. When an HTTP request is received from a browser 224, servlet 304 passes a hash table to filter engine 306 containing: (1) the headers from the HTTP request; (2) the method of the request; (3) the content-type of the request; (4) the client IP address; (5) the actual data in the request; and (6) a unique session ID.

Filter engine 306 processes the hash table and returns a return object to servlet 304 with an integer value indicating one of four conditions: (1) a signature is required on data in the HTTP request; (2) a response has been received from relying participant 104 concerning a service request that had been made; (3) the HTTP request has been passed through to Web application 310; or (4) an error occurred. Servlet 304 finishes processing the received HTTP request based on this integer value, as described below in the description of servlet 304 process flow.

In a preferred embodiment, servlet 304 may be constructed as a public class object that extends javax.servlet.http.HttpServlet. Illustrative methods for this object are shown and described in the table below. Methods inherited from the parent classes javax.servlet.http.HttpServlet, javax.servlet.GenericServlet, and java.lang are not shown in the table.

| Servlet Method Summary | |
|---|---|
| ReturnObject | callFilterEngine(java.util.Hashtable theHashtable) Calls the filter engine to determine if the request needs to be signed. |
| void | doGet(javax.servlet.http.HttpServletRequest req, javax.servlet.http.HttpServletResponse res) Handles all GET requests coming from a Web browser. JRUN automatically creates a thread of this method for every request, thus this method must be thread-safe. |
| void | doPost(javax.servlet.http.HttpServletRequest req, |

Servlet Method Summary

| | |
|---|---|
| | javax.servlet.http.HttpServletResponse res)<br>Handles all POST requests coming from a Web browser. JRUN automatically creates a thread of this method for every request, thus the method must be thread safe. |
| java.util.Hashtable | getRequestHeaders(javax.servlet.http.HttpServletRequest req)<br>Places all HTTP headers coming from the browser in a hashtable. |
| void | handleRequest(javax.servlet.ServletOutputStream out, javax.servlet.http.HttpSession currentSession, javax.servlet.http.HttpServletRequest req, javax.servlet.http.HttpServletResponse res, java.util.Hashtable theHash, byte [ ] binaryData, java.lang.String theQuery, java.lang.String theContentType)<br>This method handles every HTTP request coming from a signing interface. |
| void | init(javax.servlet.ServletConfig config)<br>Initializes the servlet and loads servlet properties. |
| void | printErrorResponse(java.util.Hashtable headers, javax.servlet.ServletOutputStream out, java.lang.String theMessage)<br>Builds error HTML response. |
| void | printPluginPage(javax.servlet.ServletOutputStream out, java.lang.String theQuery)<br>Builds the HTML page that will display the data signing plug-in. |
| byte [ ] | readMessage(javax.servlet.http.HttpServletRequest req)<br>Reads the posted data regardless of its MIME-type, whether binary data such as MS-WORD, HTML, and text documents. |
| java.util.Vector | readRequestData(javax.servlet.http.HttpServletRequest req, java.lang.String theMethod)<br>Recreates the x-www-form-url-encoded query string posted by a browser. |
| javax.servlet.http.HttpServletResponse | setServletHeaders(javax.servlet.http.HttpServletResponse res, java.util.Hashtable theHeaders)<br>Copies headers from the Web application response back to the browser response. |

In a preferred embodiment, ReturnnObject may take the following form:

```
ReturnObject{
  Int ={
  Constants.WEBAPP |
  CertStatus.GOOD |
  CertStatus.REVOKED |
  CertStatus.UNKNOWN |
  Constants.SUCCESS |
  Constants.EXCEPTION |
  }
  String = {Business Determined}
  Hashtable = {
  {Constants.PAGE}
  {Constants.HEADERS}
  {Constants. SERVICE}
  {Constants.MODE}
  }
}
```

An example of servlet 304 process flow is now described in connection with FIG. 5. As shown in FIG. 5, in step 502, servlet properties are loaded from a properties file. In step 504, servlet 304 reads data from a received HTTP request. In step 506, servlet 304 creates a hash table (comprising name and value pairs) with parameters for filter engine 306 including HTTP headers, client IP address, HTTP method (GET and SET), content type, and the actual data in the request. In step 508, servlet 304 determines if data in the HTTP request has been signed. If it has not been signed, in step 510, servlet 304 calls filter engine 306 with the hash table. Otherwise, in step 512, servlet 304 URL decodes the PKCS#7 message received from browser 224, inserts it into the hash table, and calls filter engine 306 with the hash table.

In step 514, servlet 304 receives a return object with an integer value indicating one of the four conditions described above. Based on this value servlet 304 finishes processing the original request In particular, if the return value from filter engine 306 indicates that Web application 310 has been called, then in step 516, servlet 304 causes the next Web page to be transmitted to Web browser 224. If the return value from filter engine 306 indicates that the page needs to be signed, then, in step 518, servlet 304 stores the state of filter engine 306 in a cookie and causes the page with the signing interface plug-in to be transmitted to Web browser 224. If the return value from filter engine 306 indicates that the client certificate is good then, in step 520, servlet 304 changes the state and sends a request to filter engine 306 to retrieve the next page to be displayed to buyer 106. For all other values or exceptions, servlet 304 displays an error page to the client, as shown in step 522.

Filter engine 306 receives HTTP requests from servlet 304 and applies filtering rules to distinguish pages that need to be signed or that require a system service from pages that should be passed to existing Web application 310. The rules may be loaded when filter engine 306 is first instantiated. The contents of the rules files may be a function of the seller's existing Web application 310 and business process.

HTTP requests that include data to be signed may be recognized by filter engine 306 in a variety of ways. In one preferred embodiment, filter 306 may be programmed to recognize each HTTP request that includes data to be signed on the basis of data included in the posted HTTP request data. Rules may be defined that identify data requiring signature. This variation requires application knowledge and advanced knowledge of the Web application's architecture. An understanding of the data being posted and how each posting differs in the application must be gained.

Alternatively, HTTP requests transmitted by Web browser 224 may be modified to include a special tag that indicates whether the request needs to be signed. For example, a hidden field identifying the request as requiring signature may be added to a form or an additional HTTP header line may be added to the request. Alternatively, HTTP requests requiring signature may be recognized by changing the suffix for the ISA file to handle the request (e.g., submit.dll to submit.sdll) for forms posting. If the requests are modified to include a special tag, the rules defined for filter engine 306 may be simplified and generalized for all posts requiring signatures. This alternative embodiment requires code modification to some degree, but should improve performance.

FIG. 6 illustrates an exemplary format of a rules file for filter engine 306 in a preferred embodiment. In the example shown in FIG. 6, the rules have been built to analyze a Web based collaboration tool known as AltaVista Forums. There are four rules in the example. A rule definition consists of: a mode (synchronous/asynchronous), a service (e.g., certificate validation), and a sequence of parameter names and values (location, name, and value; cookie, AltaVistaForum_AuthToken, and dsmith in the example). The first two parameters are the mode and service followed by one to n transaction specific parameters. Each parameter is separated with a semicolon and within parameters by a comma. New services may be added by installing a new plug-in module and modifying the rules file to utilize the new capability.

In a preferred embodiment, filter engine 306 provides an abstracted front-end interface via JAVA Remote Method Invocation (RMI).

In a preferred embodiment, filter engine 306 may be implemented as a public class object that extends java.lang.Object. This class implements one of the public services provided by filter engine 306's RMI server. Illustrative methods for this object are shown and described in the table below. Methods inherited from the parent class java.lang.object are not shown in the table.

| Filter Engine Method Summary | |
|---|---|
| ReturnObject | call WebApp(java.util.Hashtable theHash) |
| | Creates an HTTP or HTTPS connection to a Web Application according to the parameters in a Hashtable. |
| long | getSessionID( ) |
| | A thread safe method for generating signed transaction IDs. |
| ReturnObject | newRequestHandler(java.util.Hashtable theHash) |
| | Method called when the sate of the FilterEngine is FE_NEW_REQUEST. |
| ReturnObject | oldRequestHandler(java.util.Hashtable theHash) |
| | Method called when the state of the FilterEngine is FE_REQUEST_CHECKED. |
| ReturnObject | service(java.util.Hashtable theHash) |
| | Implementation of one of IRmiServer public services. |
| ReturnObject | signedRequestHandler(java.util.Hashtable theHash) |
| | Method called when the state of the FilterEngine is FE_SIGNED_DATA. |

When the RMI server is started, it creates an instance of the filter engine class which loads and validates the rules file as part of its constructor. FIG. 7 illustrates sample code that may be used in a preferred embodiment to invoke the filter engine RMI server. The rules class may be a public class object that extends java.lang.Object used by filter engine 306 to process the rules. A preferred embodiment of the construction of rules process methods is shown in the table below.

| Rules Process Method Summary | |
|---|---|
| java.lang.String | getMode( ) |
| | Returns the mode associated with a particular rule. |
| java.lang.String | getService( ) |
| | Returns the service associated with a particular rule. |
| static | readRules(java.lang.String theFileName) |
| java.util.Vector | Reads all rules from the RulesFile and stores them in a vector. |
| boolean | rulesMatch( ) |
| | Examines an HTTP request and determines if it needs to be signed. |
| static void | validateRules(java.util.Vector rules) |
| | Validates rules format, content, and naming of rule elements. |

FIG. 8 illustrates a preferred embodiment of the steps invoked when filter engine 306's RMI server is started. As shown in FIG. 8, in step 802, filter engine 306 loads filter 35 engine properties from a properties file. In step 804, filter engine 306 opens log files. In step 806, filter engine 306 loads utility certificates. In step 808, filter engine 306 loads the RMI server policy file. In step 810, filter engine 306 loads the rules file into memory. In step 812, filter engine 306 validates the rules to verify correct formatting. Filter engine 306 is then ready to receive requests.

FIG. 9 illustrates a preferred embodiment of the steps invoked when servlet 304 sends a request to filter engine 306. As shown in FIG. 9, in step 902, filter engine 306 receives an HTTP request and filter engine 306's state from servlet 304. If the state is FE_NEW_REQUEST, filter engine 306 invokes the state handler newRequestHandler which compares the request against signing rules, determines whether the request has to be signed, and builds a return object to be sent back to servlet 304 (step 904). If the state is FE_SIGNED_DATA, filter engine 306 executes the state handler signedRequestHandler, calling bank interface 222 to check the status of the certificate. Bank interface 222 returns the status of the certificate and filter engine 306 passes this status back in a return object to servlet 304 (step 906). If the state is FE REQUEST_CHECKED, indicating the final stage of a signed transaction, filter engine 306 executes the state handler oldRequestHandler, thus calling Web application 310. The original page is retrieved from Web application 310 and its content is returned to servlet 304 in a return object (step 908).

Figure 10:
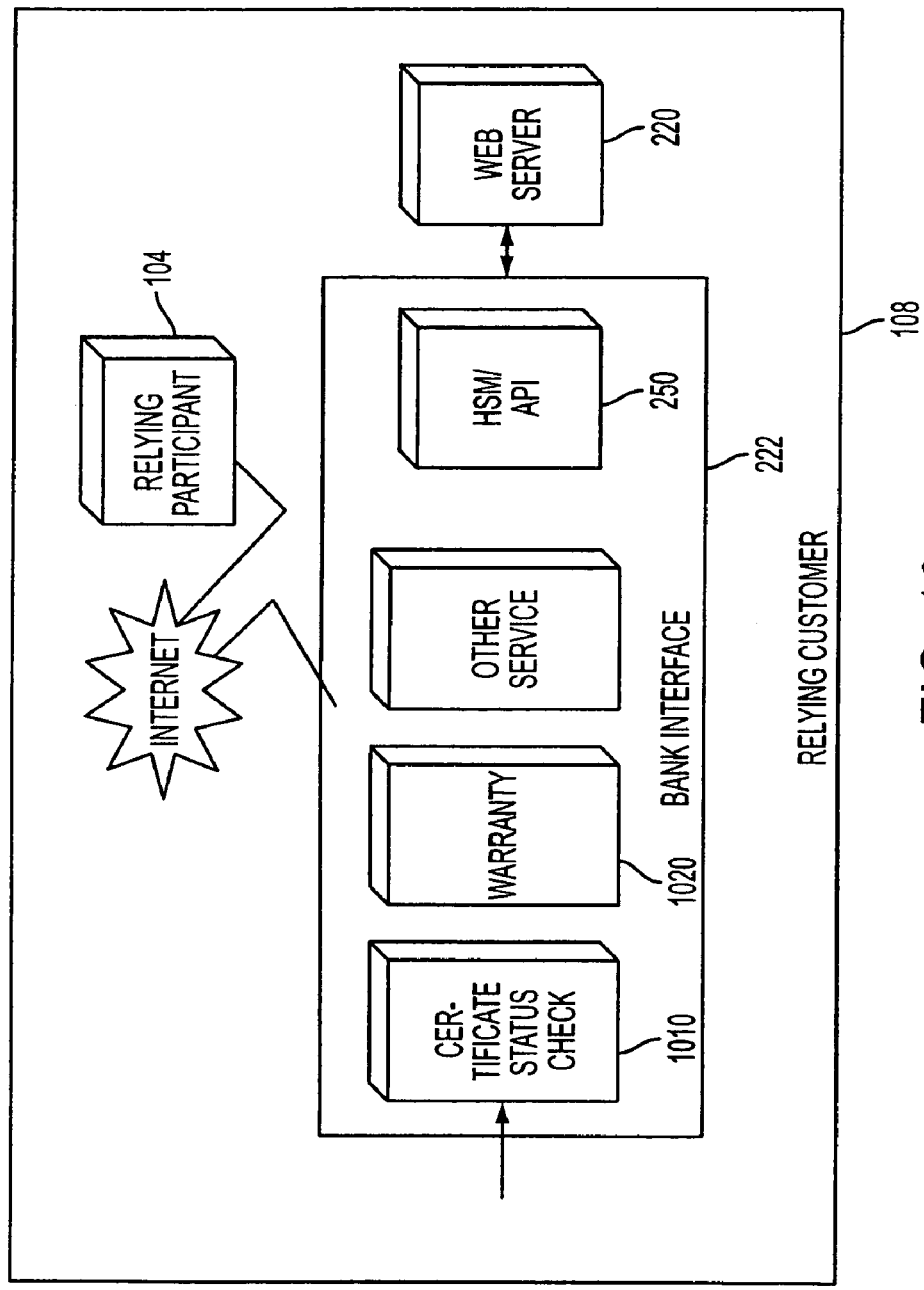
FIG. 10 illustrates a preferred embodiment for implementing bank interface 222.

A preferred embodiment for implementing bank interface 222 is shown in FIG. 10. As shown in FIG. 10, bank interface 222 is preferably designed with a plug-in based architecture that allows new service modules (e.g., certificate status check module 1010, warranty 1020, etc.) to be added as they are created.

Relying customer 108 initiates a service request by accessing one of these modules, which ensures proper message formatting and protocol handling. For example, certificate status check module 1010 creates a proper OCSP request and submits it to relying participant 104.

In a preferred embodiment, bank interface 222 supports an abstract front-end interface to allow communication via several different middleware technologies used to access it from other code modules. A number of technologies may be used to access bank interface 222 including Common Object Request Broker Architecture ("CORBA"), Component Object Model ("COM"), Remote Method Invocation ("RMI"), and TCP/IP Sockets. In a preferred embodiment, an RMI binding implementation may be used to expand the abstract interface to include CORBA and COM versions.

FIG. 11 illustrates the steps invoked when the RMI server of bank interface 222 is started in a preferred embodiment. As shown in FIG. 11, in step 1102, bank interface 222 loads bank interface properties from a bank interface file. In step 1104, bank interface 222 loads log files. In step 1106, bank interface 222 loads utility certificates. In step 1108, bank interface 222 loads the RMI server policy file. In step 1110, bank interface 222 loads cryptographic modules, either software or hardware as specified in the properties file. At this point, bank interface 222 is ready to receive service requests from filter engine 306 and to call the bank interface service manager with a service request that contains the name of the service, mode of the service, and a message.

FIG. 12 illustrates the steps invoked when filter engine 306 sends a request to bank interface 222 in a preferred embodiment. As shown in FIG. 12, in step 1202, bank interface 222 retrieves relying customer 108's and root entity 110's certificates from memory. In step 1204, bank interface 222 retrieves subscribing customer 106's and issuing participant 102's certificates from a CMS (Cryptographic Message Syntax) also referred to as PKCS#7 received from buyer 106. In step 1206, bank interface 222 verifies the signature on the CMS message and checks the integrity of the signed data. In step 1208, bank interface 222 verifies the signature on subscribing customer 106's certificate using issuing participant 102's certificate. In step 1210, bank interface 222 verifies the signature on issuing participant 102's certificate using root entity 110's certificate. In step 1212, bank interface 222 checks the validity period on those two certificates against the current date. In a preferred embodiment, bank interface 222 does basic path validation as specified in RFC 2459 Section 6.1 on the certificate chain extracted from the PKCS#7 message.

In step 1214, bank interface 222 retrieves the URL for OCSP responder $204_{RP}$ from relying customer 108's certificate. In step 1216, bank interface 222 creates an OCSP request for subscribing customer 106's certificate signed by relying customer 108. All OCSP requests preferably contain a Service Locator Extension used to locate the relying participant which is set by an Authority Information Access (AIA) extension defined in the seller's certificate. Alternatively, bank interface 222 may employ a different mechanism to configure the location of relying participant 104 which may override the location information in the AIA extension. In a preferred embodiment, bank interface 222 supports both raw OCSP and OCSP wrapped in XML. Preferred aspects of both a raw OCSP embodiment and an OCSP wrapped in XML embodiment are described below.

In step 1218, bank interface 222 logs the OCSP request in a transaction log. In step 1220, bank interface 222 creates an HTTP(S) connection to OCSP responder $204_{RP}$ and transmits the OCSP request to it. In a preferred embodiment, bank interface 222 may be adapted to transmit all OCSP requests to relying participant 104, even when bank interface 222 can tell that relying participant 104 is not the participant that issued the certificate that is the subject of the request. In step 1222, bank interface 222 receives an OCSP response from OCSP responder 204R and verifies the signature on the response using OCSP Responder $204_{RP}$'s certificate. In step 1224, bank interface 222 extracts the status of subscribing customer 106's certificate from the response. Steps 1216 to 1224 are repeated for issuing participant 102's certificate and relying participant 104's OCSP Responder's certificate as shown in step 1226. In step 1228, bank interface 222 logs the OCSP response for each of these requests to the transaction log.

If the status of all the responses is "good" then, in step 1230, bank interface 222 returns a message to that effect to filter engine 306. Otherwise, bank interface 222 returns the status of the checked certificate to filter engine 306. In step 1232, bank interface 222 logs all signed requests to an event log and all errors to an error log. All exceptions are returned to the client as a part of the return object.

A preferred embodiment of the methods that may be incorporated in a certificate status check module of bank interface 222 are shown in the table below. These methods are used to perform the basic steps described above for certificate status checking. Bank interface certificate status checking method is preferably a public class object that extends java.lang.Object. The methods inherited from the parent class java.lang.Object are not shown in the table.

| | Certificate Status Check Method Summary |
|---|---|
| EOCSPRequest | createOCSPRequest(com.identrus.bankinterface. Certificate cert, com.identrus.bankinterface.Certificate issuerCert, com.identrus.bankinterface.Certificate RequestorCert, com.identrus.bankinterface.CertID certId) Creates an OCSPRequest with the corresponding extensions necessary for forwarding/proxying. |
| com.identrus. bankinterface. CertID | getCertificateID(com.identrus.bankinterface. Certificate cert) Builds a CertID object that identifies a certificate. |
| void | getCertStatus(com.identrus.bankinterface.OCSP Response resp, com.identrus.bankinterface.CertID certId, int certType) Retrieves the status of a certificate, by ID, from an OCSP response and checks its status. |
| void | getCertsVerifyMessage(com.identrus.bankinterface. .SignedData sd, java.util.Hastable data) Get the SC, CA Certificates from the CMS Message, and verify the signature on the CMS Message. |
| java.lang.String | getURL(com.identrus.bankinterface.Certificate c) Get the URL from the AuthorityInfoAccess certificate extension. |
| boolean | isResponseSuccessful(com.identrus.bankinterface. OCSPResponse resp) Check the OCSP response status. |
| void | logAndBuildReturnObject(int certStatus, java.lang.String strMessage) Log the OCSP response results, and build the ReturnObject. |
| void | processOCSP(com.identrus.bankinterface.Certificate cert, com.identrus.bankinterface.Certificate issuer, com.identrus.bankinterface.Certificate requestor, int certType) Checks the status of a certificate issued by the issuer and is being checked by the requestor. |
| com.identrus. bankinterface. OCSPResponse ReturnObject | sendAndReceiveMessage(EOCSPRequest req) Sends an OCSPRequest and retrieves the OCSPResponse received from the Responder. serviceRequest(java.util.Hashtable data) The main logic for the Certificate Status Check Service. |
| com.identrus. bankinterface. Certificate | verifyResponseSignature(com.identrus.bankinterface. OCSPResponse resp) Retrieves responder certificates from the response and verifies the Signature of the OCSP response. |

An example of system operation using the passive integration implementation described above is shown in FIG. 13. As shown in FIG. 13, in step 1301, a buyer 106 clicks the 'Submit' button on an HTML form displayed to buyer 106 by Web browser 224. In step 1302, Web browser 224 posts form data to seller 108's Web site. In step 1303, filter 302 redirects the received HTTP request to servlet 304. In step 1304, servlet 304 passes the HTTP request to filter engine 306. In step 1305, filter engine 306 determines if the HTTP request requires signature by buyer 106 and, if so, creates a Return-to-Browser URL (as a GET with parameters for data) representing the data of the original POST or GET form posting and returns it along with instructions to get the data signed to servlet 304. In step 1306, servlet 304 builds a response with either an applet tag pointing to the signing interface applet or a call to a browser plug-in, the arguments Return-to-Browser URL, and the data to sign.

In step 1307, SDK Web server 312 returns servlet 304's response to Web browser 224. In step 1308, Web browser 224 displays the HTML page and, if necessary, requests the appropriate signing interface applet or plug-in. In step 1309, Web browser 224 displays the client interface applet or activates the plug-in. Arguments may include the data to be signed and possibly a URL.

In step 1310, buyer 106 clicks a button to approve signing of the form data. In step 1311, the client interface (applet or plug-in) calls a smart card API to request that smart card 226 sign an SHA-1 hash of the form data. In step 1312, buyer 106 enters its PIN when the driver asks for it.

In step 1313, the smart card API returns the signed form data to the signing interface. In step 1314, the signing interface makes an HTTP connection to SDK Web server 312 and submits the signed form data. In step 1315, SDK Web server 312 passes the request to servlet 304.

In step 1316, servlet 304 passes the request to filter engine 306. In step 1317, filter engine 306 calls bank interface 222 with the signed data. In step 1318, bank interface 222 creates an OCSP request and calls the open card API to request that seller 108's HSM sign an SHA-1 hash of the request.

In step 1319, open card API calls seller 108's HSM OS Driver. In step 1320, HSM OS Driver calls seller 108's HSM to sign the request. In step 1321, the HSM OS Driver returns the signed request to open card API.

In step 1322, open card API returns the signed request to bank interface 222. In step 2028, bank interface 222 transmits the request to relying participant 104. In step 2029, relying participant 104 forwards the request to issuing participant 102.

In step 1330, issuing participant 102 returns a signed response to relying participant 104. In step 1331, relying participant 104 requests validation of issuing participant 102's certificate from root entity 110. In step 1332, root entity 110 returns a signed OCSP response to relying participant 104.

In step 1333, relying participant 104 returns a signed OCSP response to bank interface 222. In step 1334, bank interface 222 validates the signed data and records the transaction in the log. In step 1335, bank interface 222 validates the signed data and stores the signed data and the signed response from relying participant 104 in SDK Web server 312's database.

In step 1336, bank interface 222 returns an OK or failure result to filter engine 306. In step 1337, filter engine 306 returns failure result to servlet 304 or passes initial request to Web application server 220. In step 1338, if the request for system service resulted in a failure (e.g., if the result of a certificate status check was that the certificate is not valid), servlet 304 builds a response indicating that a failure occurred. In step 1339, SDK Web Server 312 returns servlet 304's failure response to browser 224.

As noted, the second preferred implementation for integrating digital signature messaging software with a seller's existing Web application is referred to as active integration because it requires modification of the seller's existing Web application. A preferred architecture for implementing active integration at a seller's Web site is shown in FIG. 14. As shown in FIG. 14, the seller's Web site is preferably provided with a bank interface 222 in addition to its existing Web server 220 and Web application 310. The functionality of the other digital signature messaging software components described above is preferably incorporated directly into Web application 310.

If the seller's Web application 310 exposes an Application Programming Interface (API) for enhancements, it may be used to integrate the application with the disclosed pubic key infrastructure. If Web application 310 is implemented using a tool with a set of APIs and well-documented techniques extending the application, developers with less knowledge of Web application 310 and its technologies may be able to implement the active integration solution. If no API exists, the actual source code of Web application 310 or the tool used to build it may be modified. In either case, the integration code is preferably adapted to call bank interface 222, effectively bypassing the need for filter engine 306.

Active integration requires advanced knowledge of the technologies used to implement Web application 310. One important attribute of active integration in comparison to passive integration is that all incoming requests are processed in their traditional manner, as opposed to being filtered. This results in a positive performance gain compared to passive integration.

An example of system operation using the active integration implementation described above is shown in FIG. 15. As shown in FIG. 15, in step 1501, buyer 106 requests a form that will require signing when submitted. In step 1502, Web browser 224 submits an HTTP request to seller 108's Web site. In step 1503, Web server 220 forwards the HTTP request to Web application 310.

In step 1504, Web application 310 returns an HTML page that references the client signing interface. In step 1505, Web server 220 returns the HTML page to Web browser 224. In step 1506, Web browser 224 requests the client signing interface from Web server 220.

In step 1507, Web server 220 retrieves the client signing interface. In step 1508, Web server 220 returns the client signing interface to Web browser 224. In step 1509, buyer 106 clicks the submit and sign button on the displayed Web page.

In step 1510, Web browser 224 calls the client signing interface. In step 1511, the client signing interface calls Windows PC/SC to have the buyer's smart card 226 sign the data. In step 1512, buyer 106 enters its PIN.

In step 1513, Windows PC/SC calls buyer 106's smart card 226 to sign the data. In step 1514, Windows PC/SC returns the signed data to the signing interface. In step 1515, the signing interface returns the signed data to Web browser 224.

In step 1516, Web browser 224 posts the signed data to Web server 220. In a preferred embodiment, the posted data is a PKCS#7 message. In step 1517, Web server 220 passes the signed posting to Web application 310. In step 1518, integration code added to Web application 310 calls bank interface 222 to verify the signature on the form.

In step 1519, bank interface 222, generates an OCSP request and calls HSM OS Driver to sign it. As noted above, bank interface 222 may retrieve subscribing customer 106's and issuing participant 102's certificates from a CMS (Cryptographic Message Syntax) also referred to as PKCS#7 received from buyer 106 and preferably verifies the signatures on the CMS message and buyer's certificate, and checks the integrity of the signed data.

In step 1520, HSM OS Driver calls HSM 230 to sign the OCSP request. In step 1521, HSM OS Driver returns the signed request to bank interface 222. In step 1522, bank interface 222 transmits the request to relying participant 104. In step 1523, relying participant 104 forwards the request to issuing participant 102. In step 1524, issuing participant 102 returns a signed OCSP response to relying participant 104. In step 1525, relying participant 104 calls root entity 110 to validate the certificates of issuing participant 102. In step 1526, root entity 110 returns a signed response to relying participant 104.

In step 1527, relying participant 104 returns the signed response to interface 222. In step 1528, bank interface 222 stores the signed data and the signed response from relying participant 104 in a signed documents repository. In step 1529, bank interface 222 writes a transaction log message. In step 1530, bank interface 222 returns the result of the request to Web application 310. In step 1531, Web application 310 interprets the form post and returns the next page (or an error) to Web server 220. In step 1532, Web server 220 returns the page to Web browser 224.

In a preferred embodiment, the system supports flat (text) files and Microsoft Access. Logging with MS-Access may be achieved using ODBC drivers, commonly distributed for all Windows platforms. Also provided in a preferred embodiment is a transaction monitoring tool. The tool helps relying customer 108 query the transaction log. The following information is preferably stored as a log: subscribing customer 106's IP address, subscribing customer 106's name extracted from the certificate, the date and time of the transaction, the name of the service, the mode of the service (synchronous or asynchronous), and the message logged.

As indicated above, properties are used to configure various components of the present system by supplying user defined parameter values contained in a file. FIG. 16 illustrates an exemplary set of properties for servlet 304. FIG. 17 illustrates an exemplary set of properties for filter engine 306. FIG. 18 illustrates an exemplary set of properties for bank interface 222.

As noted above, in a preferred embodiment, bank interface 222 supports both raw OCSP and OCSP wrapped in XML. In a preferred embodiment, bank interface 222 is adapted to provide the following features in supporting raw OCSP:

1. Establish an SSL connection for all OCSP requests and responses. Client authentication is preferably not provided for this SSL session.
2. Verify the revocation status of each certificate in the chain except that of root entity 110.
3. Not verify the revocation status of root entity 110's certificate.
4. Cause all OCSP requests to be signed with relying customer 108's private signing key.
5. Authenticate all OCSP responses.
6. Include a nonce in the OCSP request in cases where a fresh response (rather than a cached response) is being transmitted. The OCSP response preferably includes the nonce submitted in the initial request.
7. If desired, the "Freshness Proof" of relying participant 104's certificate may be ignored. In that case, a new OCSP request is preferably made for the revocation status of relying participant 104's signing certificate.

In a preferred embodiment, bank interface 222 is adapted to provide the following features in supporting OCSP wrapped in XML:

1. Conform XML requests to a messaging set defined by root entity 10. An exemplary messaging set is described in copending U.S. provisional patent application Ser. No. 60/231,319, filed on Sep. 8, 2000, entitled Transaction Coordinator Certificate Status Check (CSC) Protocol Definition, Transaction Coordinator Messaging Protocol Definition.
2. Generate and use a unique transaction ID.
3. Cause the XML request to be signed by relying customer 108's private key. If desired, the embedded OCSP request may also be signed by the Relying Customer's signing key.
4. A nonce may be included in the embedded OCSP request to indicate that a fresh response is required rather than a cached response.
5. If desired, the "Freshness Proof" of relying participant 104's certificate may be ignored. In that case, revocation information regarding relying participant 104's signing certificate is preferably verified in a separate request.

In a preferred embodiment, the digital signature messaging software described above is adapted to process a signed PKCS#7 request from subscribing customer 106 and post a Certificate Status Check request to relying participant 108 in one second or less. Certificate status check responses from relying participant 104 are preferably processed in one second or less.

In a preferred embodiment, the digital signature messaging software described above is adapted to reliably handle 350 concurrent requests without any performance degradation in a single minute at peak load. In a preferred embodiment, the digital signature messaging software described above is available 90% of the time during interoperability testing and 95% of the time during pre-production testing. During production, availability preferably meets requirements specified by root entity 110.

In an alternative preferred embodiment, rather than supporting both raw OCSP and OCSP wrapped in XML, the system may employ a pure XML implementation. Standards based protocols for certification validation may also be considered rather than devising a new proprietary protocol. One such protocol is the "Simple Certificate Validation Protocol (SCVP)" which is in an Internet-draft form at the current time. This protocol would enable a relying customer 108 to offload path validation responsibilities to a remote path processing server (RPPS).

While the invention has been described in conjunction with specific embodiments, it is evident that numerous alternatives, modification, and variations will be apparent to those skilled in the art in light of the foregoing description.

The invention claimed is:

1. Apparatus for integrating a seller's Web site with a public key infrastructure, wherein:
   the public key infrastructure comprises a buyer computer having a Web browser adapted to invoke a signing interface to digitally sign electronic messages and a seller's bank computer system adapted to receive service requests from the seller and to respond to those requests; and
   the seller's Web site comprises:
   a filter adapted to redirect HTTP requests received from the Web browser;
   coupled to the filter, a Web server;
   coupled to the Web server, an Internet server application adapted to receive redirected HTTP requests from the filter and to process the redirected HTTP requests; and
   coupled to the Internet server application, a filter engine adapted to receive processed HTTP requests from the Internet server application and to identify which HTTP requests require a digital signature by the buyer computer and which requests do not require a digital signature by the buyer computer.

2. The apparatus of claim 1, wherein:
   the filter engine is further adapted to identify HTTP requests that require accessing a service offered by the seller's bank and to formulate requests for the service; and
   the seller's Web site further comprises, coupled to the filter engine, a bank interface adapted to receive requests from the filter engine, reformat the requests, and transmit the requests to the seller's bank.

3. The apparatus of claim 2, wherein the bank interface is further adapted to receive service responses to the requests from the seller's bank, and forward the responses to the filter engine.

4. The apparatus of claim 2, wherein at least one service is certificate validation of a buyer digital certificate.

5. The apparatus of claim 1, wherein the Web server is adapted to parse requests redirected by the filter.

6. The apparatus of claim 1, wherein services provided by the seller's bank are provided within the context of a four-corner model.

7. The apparatus of claim 6, wherein the four-corner model comprises the buyer, the seller, the seller's bank, and a buyer's bank.

8. The apparatus of claim 1, wherein the filter is implemented using ISAPI.

9. The apparatus of claim 1, wherein the Internet server application is adapted to generate HTTP responses based on data received from the filter engine.

10. The apparatus of claim 1, wherein the Internet server application is adapted to pass hash tables to the filter engine.

11. The apparatus of claim 10, wherein each hash table comprises headers from a redirected HTTP request.

12. The apparatus of claim 10, wherein each hash table indicates a method of the redirected HTTP request.

13. The apparatus of claim 10, wherein each hash table comprises a content-type of a redirected HTTP request.

14. The apparatus of claim 10, wherein each hash table comprises a buyer computer's IP address.

15. The apparatus of claim 10, wherein each hash table comprises actual data in a redirected HTTP request.

16. The apparatus of claim 10, wherein each hash table comprises a unique session ID.

17. The apparatus of claim 1, wherein the filter engine determines whether an HTTP request contains data requiring signature by applying filtering rules.

18. The apparatus of claim 1, wherein the filter engine is programmed to recognize HTTP requests transmitted by the Web browser that have been modified to include a special tag that indicates whether the request includes data that requires a digital signature by the buyer's computer.

19. The apparatus of claim 1, wherein the filter engine provides an abstracted front end interface via an object oriented computer programming language remote method invocation.

20. The apparatus of claim 1, wherein the filter engine employs a rules class.

21. The apparatus of claim 1 wherein the seller's Web site further comprises, coupled to the filer engine, a bank interface designed with a plug-in based architecture.

22. The apparatus of claim 1 wherein the seller's Web site further comprises, coupled to the filer engine, a bank interface supporting an abstract front-end interface to allow communication via a plurality of middleware technologies.

23. The apparatus of claim 1 wherein the seller's Web site further comprises, coupled to the filter engine, a bank interface adapted to create and transmit OCSP requests.

24. The apparatus of claim 1 wherein the seller's Web site further comprises, coupled to the filter engine, a bank interface comprising a certificate status check module.

25. A system for integrating a seller's Web site with a public key infrastructure, the Web site comprising a Web server and a Web application, the public key infrastructure comprising a buyer computer comprising a Web browser adapted to invoke a signing interface to digitally sign electronic messages, the public key infrastructure further comprising a seller's bank computer system adapted to receive service requests from the seller and to respond to those requests with digitally signed service responses; the system comprising:

a filter adapted to redirect HTTP requests received from the Web browser;

coupled to the filter, a Web server;

coupled to the Web server, an Internet server application adapted to receive redirected HTTP requests from the filter and to process the redirected HTTP requests; and coupled to the Internet server application, a filter engine adapted to receive processed HTTP requests and to identify HTTP requests that contain data requiring signature by the buyer; wherein:

the Internet server application is a servlet.

26. The system of claim 25, wherein the servlet is constructed as a public class object that extends javax.servlet.HTTP.HttpServlet.

27. The system of claim 26, wherein the public class object comprises at least one of a callFilterEngine method, a doGet method, a doPost method, a getRequestHeaders method, a handle Request method, an init method, a print ErrorResponse method, a printPluginPage method, a readMessage method, a read RequestData method, and a setServletHeaders method.

28. The system of claim 25, wherein the filter engine is adapted to return an object to the servlet.

29. The apparatus of claim 28, wherein the object comprises an integer value indicating one of the following four conditions:

a signature is required on data in the HTTP request;

a response has been received from the seller's bank concerning a service request;

the HTTP request has been passed through to a Web application;

an error occurred.

30. The apparatus of claim 29, wherein when the integer value indicates that a signature is required on data in the HTTP request, the Internet server application stores a state of the filter engine in a cookie and causes a Web page containing the cookie and an instruction to sign data to be transmitted to the Web browser.

31. A system for integrating a seller's Web site with a public key infrastructure, the Web site comprising a Web server and a Web application, the public key infrastructure comprising a buyer computer comprising a Web browser adapted to invoke a signing interface to digitally sign electronic messages, the public key infrastructure further comprising a seller's bank computer system adapted to receive service requests from the seller and to respond to those requests with digitally signed service responses; the system comprising:

a filter adapted to redirect HTTP requests received from the Web browser;

coupled to the filter, a Web server;

coupled to the Web server, an Internet server application adapted to receive redirected HTTP requests from the filter and to process the redirected HTTP requests; and coupled to the Internet server application, a filter engine adapted to receive processed HTTP requests and to identify HTTP requests that contain data requiring signature by the buyer; wherein:

the filter engine is implemented as a public class object that extends java.lang.object.

32. The system of claim 31, wherein the public class object comprises at least one of the following methods: a callWebApp method, a getSessionID method, a newRequestHandler method, an oldRequestHandler method, a service method, and a signedRequestHandler method.

33. A system for integrating a seller's Web site with a public key infrastructure, the Web site comprising a Web server and a Web application, the public key infrastructure comprising a buyer computer comprising a Web browser adapted to invoke a signing interface to digitally sign electronic messages, the public key infrastructure further comprising a seller's bank computer system adapted to receive service requests from the seller and to respond to those requests with digitally signed service responses; the system comprising:

a filter adapted to redirect HTTP requests received from the Web browser;

coupled to the filter, a Web server;

coupled to the Web server, an Internet server application adapted to receive redirected HTTP requests from the filter and to process the redirected HTTP requests;

coupled to the Internet server application, a filter engine adapted to receive processed HTTP requests and to identify HTTP requests that contain data requiring signature by the buyer; and coupled to the filter engine, a rules class, wherein the rules class comprises at least one of the following methods: a getMode method, a getservice method, a readRules method, a rulesMatch method, and a validateRules method.

34. A system for integrating a seller's Web site with a public key infrastructure, the Web site comprising a Web server and a Web application, the public key infrastructure comprising a buyer computer comprising a Web browser adapted to invoke a signing interface to digitally sign electronic messages, the public key infrastructure further comprising a seller's bank computer system adapted to receive service requests from the seller and to respond to those requests with digitally signed service responses; the system comprising:

a filter adapted to redirect HTTP requests received from the Web browser;

coupled to the filter, a Web server;

coupled to the Web server, an Internet server application adapted to receive redirected HTTP requests from the filter and to process the redirected HTTP requests;

coupled to the Internet server application, a filter engine adapted to receive processed HTTP requests and to identify HTTP requests that contain data requiring signature by the buyer; and coupled to a filter engine, a bank interface, wherein the bank interface comprises a public class object that extends java.lang.object.

35. A system for integrating a seller's Web site with a public key infrastructure, the Web site comprising a Web server and a Web application, the public key infrastructure comprising a buyer computer comprising a Web browser adapted to invoke a signing interface to digitally sign electronic messages, the public key infrastructure further comprising a seller's bank computer system adapted to receive service requests from the seller and to respond to those requests with digitally signed service responses; the system comprising:

a filter adapted to redirect HTTP requests received from the Web browser;

coupled to the filter, a Web server;

coupled to the Web server, an Internet server application adapted to receive redirected HTTP requests from the filter and to process the redirected HTTP requests;

coupled to the Internet server application, a filter engine adapted to receive processed HTTP requests and to identify HTTP requests that contain data requiring signature by the buyer; and coupled to the filter engine, a public class object, wherein the public class object comprises at least one of a createOCSPRequest method, a getCertificateID method, a getCertStatus method, a getCertsVerifyMessage method, a getURL method, an is ResponseSuccessful method, a logAndBuildReturnObject method, a processOCSP method, a sendAndReceiveMessage method, a serviceRequest method, and a verifyResponseSignature method.

36. Apparatus for integrating a seller's Web site with a public key infrastructure, said apparatus comprising:

a Web server located at the seller's Web site;

a Web application coupled to the Web server and also located at the seller's Web site, the Web application adapted to:

identify which HTTP requests from a buyer require a digital signature of the buyer and which HTTP requests do not require a digital signature of the buyer;

for each HTTP request requiring a digital signature, create a Web page for transmission to a browser controlled by the buyer, said Web page causing the browser to invoke a signing interface enabling the buyer to digitally sign the data, said signing interface comprising a smart card containing a private key associated with the buyer; and identify which HTTP requests require a service provided by an entity other than the seller and which HTTP requests do not require a service provided by an entity other than the seller; and coupled to the Web application and also located at the seller's Web site, an interface module adapted to receive from the Web application requests for service from entities other than the seller, to format and transmit the requests, to receive responses to the requests, and to forward the responses to the Web application.

* * * * *